Patented Feb. 12, 1952

2,585,199

UNITED STATES PATENT OFFICE 2,585,199

N-AMINOALKYLMORPHOLINE VISCOSITY STABILIZED POLYAMIDE AND PROCESS FOR MAKING SAME

Frederick Kingsbury Watson, Wilmington, Del., assignor to E. I. du Pont de Nemours and Company, Wilmington, Del., a corporation of Delaware No Drawing. Application February 3, 1950, Serial No. 142,363

17 Claims. (Cl. 260—78)

This invention relates to polymeric materials, and more particularly to improvements in the preparation of polyamides and to the products thus produced.

In Patents 2,071,250, 2,071,253 and 2,130,948 are disclosed high molecular weight polyamides which are capable of being formed into useful fibers. These fiber-forming polyamides are referred to as superpolyamides. They are made by heating amino acids, or by heating diamines with dibasic carboxylic acids under conditions causing amide formation. Linear condensation occurs with the formation of polyamides.

In the case of diamines and dibasic carboxylic acids (which in this specification and in the claims includes dicarboxylic acids and amide-forming derivatives of dibasic carboxylic acids) the reaction may be represented as follows:

$x\text{NH}_2\text{GNH}_2 + x\text{HOOCG'COOH} \rightarrow 2x-1\text{H}_2\text{O} +$
 (A)

in which G and G' represent divalent organic radicals and $x$ represents an indefinite large number. If suitable reactants are selected and the polymerization proceeds far enough, as shown in the previously mentioned applications, polymers are formed which are capable of yielding useful fibers. It has further been shown that this fiber-forming property does not generally appear until the polymers have an intrinsic viscosity of at least 0.4. These superpolyamides appear to be crystalline and can be converted into very useful fibers, among other methods, by melt spinning, i. e., by extruding the molten polymer through small orifices, e. g., a spinneret, and then cold-drawing, that is drawing at a temperature below the melting point of the polymer or stretching the resultant filaments until they show fiber orientation. In many instances this method of spinning is simpler and more economical than conventional methods of spinning from solution. However, most superpolyamides, and particularly those most useful for the preparation of textile fibers, have high melting points, often in the neighborhood of 200–300° C. At the temperatures required to spin such polymers from a melt (generally 10 to 50° C. above their melting points) these products undergo further polymerization. This fact is also true of polyamides derived from amino acids. This further polymerization makes it difficult to prepare uniform filaments from the polymer, for when a sample of the latter is heated in a melt spinning device, the filaments first extruded consist of a lower molecular weight polymer than those extruded near the end of the spinning operation. Moreover, in order to obtain filaments of uniform denier throughout the spinning operation, it is necessary to increase the temperature and/or the pressure of the molten polymer as the polymer mass becomes more viscous. Further, it is difficult to spin a polyamide having a relative viscosity greater than 40. (Relative viscosity is determined in a conventional Ostwald viscometer at 25° C. A solution of the polyamide is prepared in 90% formic acid having a concentration of 11 grams per 100 c. c. solvent. The time required for a given volume of this solution to pass thru the viscometer divided by the time required to pass an equal volume of solvent thru the viscometer is taken as the relative viscosity of the polymer.) In order to overcome this difficulty it has been proposed in the mentioned Patent 2,130,948 to use a small excess (up to 5 molar per cent) of either the diamine or the dibasic carboxylic acid in the preparation of the polyamide. This gives a polymer whose terminal groups are essentially all amino or all carboxyl groups depending upon whether the diamine or the dibasic carboxylic acid was used in excess. For example, the formula of a polymer prepared with excess dibasic carboxylic acid may be represented as follows:

$\text{HOOCG'CO(NHGNHCOG'CO)}_x-$
 (B)

These polymers, which are essentially viscosity stable, are claimed in Patent 2,130,948.

An object of this invention is to prepare polyamides which do not undergo further reaction when heated under polymerizing conditions. A further object is to prepare polyamides which do not undergo appreciable viscosity change when heated at their melting point. A still further object is to prepare polyamides which can be spun into fibers from melt without undergoing substantial change in viscosity. Still another object is to prepare polyamides possessing superior dyeing properties. Other objects will appear hereinafter.

These objects are accomplished by heating polyamide-forming reactants, particularly diamine-dibasic carboxylic acid mixtures in the presence of an N-amino-alkylmorpholine of the formula

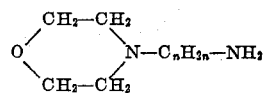

wherein $n$ is a whole number from 2 to 12 inclusive, and the nitrogen atoms are separated by at least two carbon atoms.

I have found that viscosity stable polyamides of improved dyeing properties can be obtained by preparing polyamides in the presence of a small amount, generally 0.1 to 5 molar per cent of an N-aminoalkylmorpholine such as described above based on the diamine content of the polyamide. These substances which are added to impart viscosity stability to the polyamide will be referred to as the "stabilizer." The stabilizer serves the purpose of allowing the production of any desired molecular weight polyamide by controlling the number of carboxyl and amine groups. Thus, if a polyamide is desired having a certain relative viscosity, it is achieved by the simple procedure of incorporating a predetermined amount of stabilizer with the initial reactants. When the desired viscosity range is reached, equilibrium is established and the polymerization stops. The ultimate viscosity of the polyamide obtained is dependent upon the amount of stabilizer added: the more stabilizer that is added the lower the ultimate viscosity. The stabilizer may be added to the polyamide-forming reactants before, during, or after polymerization. A stabilizer may also be added to (heated with) a preformed polymer to lower its viscosity.

Representative examples of specific N-alkylmorpholines suitable for purposes of this invention are: N-aminoethylmorpholine, N-aminopropylmorpholine, N-aminobutylmorpholine, N-aminoisobutylmorpholine, N-amino-sec-butylmorpholine, N-amino-t-butylmorpholine, N-aminoamylmorpholine, N-aminoisoamylmorpholine, N-aminoisohexylmorpholine, N-aminoisoheptylmorpholine, N-aminoisooctylmorpholine, N-amino-2-ethylhexylmorpholine, N-aminoisodecylmorpholine, and N-aminoisolaurylmorpholine.

The term polyamide-forming reactant is used to designate a bifunctional compound which yields a polyamide when heated alone or in admixture with a complementary polyamide-forming reactant. It includes polymerizable amino acids or amide-forming derivatives thereof (i. e., an ester, acid halide, amide, or anhydride), diamines, dicarboxylic acids, and amide-forming derivatives of dibasic carboxylic acids. In contrast to the polyamide-forming reactants, the monofunctional amide-forming reactants are not alone capable of yielding polymers.

It has been stated that the quantity of stabilizer employed in the preparation of the products of this invention determines the ultimate viscosity of the product. Quantities of stabilizer from 0.1 to 5.0, and preferably from 0.3 to 1.5, molar per cent of the diamine are usually used in the preparation of viscosity stable polyamides described herein. By a mol of diamine-dibasic carboxylic acid salt is meant the quantity of salt obtained from one mol of diamine and one mol of dibasic carboxylic acid. More than 5 mol per cent of stabilizer may be used, however, when it is desired to prepare products of low viscosity. For the preparation of fiber-forming polyamides it is generally desirable to have the ultimate intrinsic viscosity of the polyamide in the range from 0.5 to 2.0. The quantity of stabilizer required to obtain a product of a given intrinsic viscosity can be determined by experiment. When the quantity and conditions for the preparation of a given product have been determined, the results can be duplicated fairly readily. The quantity of stabilizer necessary to prepare a product of a given intrinsic viscosity $[\eta]$ can also be determined, roughly at least, by the following equation:

$$\text{Mols stabilizer required} = \frac{\text{mol. wt. of salt} \times \text{mols of salt}}{16{,}000\,[\eta]}$$

in which "salt" refers to the diamine-dibasic carboxylic acid salts or to the mixture of polyamide-forming reactants used.

While the invention has been described with special reference to the preparation of viscosity stable polyamides of the diamine-dibasic carboxylic acid type, it is also applicable to the preparation of polyamides from amino acids whose amino nitrogen carries at least one hydrogen atom. It is possible, for example, to prepare viscosity stable polyamides by heating a polymerizable amino acid or an amide-forming derivative thereof in the presence of the stabilizer.

The following examples are further illustrative of the principles and practice of this invention. Parts are by weight unless otherwise indicated.

To 50 parts of the dry salt (diamine-dicarboxylic acid) is added an amount of stabilizer as shown below, together with 50 parts of water. This is heated in a closed autoclave until a pressure of 250 pounds per square inch is reached. This pressure is maintained by bleeding off steam while the temperature is gradually raised over a period of 3–4 hours until 275° C. is reached. This temperature is maintained and the pressure is reduced to atmospheric over a period of two hours. Heating is continued at 275° C. and atmospheric pressure for one-half hour. The polymer is then extruded onto a water-cooled wheel and broken into chip. The chip is suitable for charging into a conventional melt-spinning unit for the production of yarns, films or molded articles. The table below shows the amounts and kinds of stabilizers used, together with the results obtained. Several control examples (no stabilizer) were run for comparative data.

| Example | Polymer | Stabilizer | Amt. of Stabilizer Parts by Wt. to 50 Parts Salt | Rel. Vis. of Polymer |
|---|---|---|---|---|
| Control | A | None | | 40–60 |
| 1 | A | N-aminoethylmorpholine | 0.2510 | 31 |
| 2 | A | N-aminopropylmorpholine | 0.1655 | 37 |
| 3 | A | N-aminobutylmorpholine | 0.3050 | 30 |
| 4 | A | N-aminoamylmorpholine | 0.3320 | 31 |
| 5 | A | N-aminohexylmorpholine | 0.3590 | 31 |
| Control | B | None | | 50–65 |
| 6 | B | N-aminoethylmorpholine | 0.1495 | 38 |
| 7 | B | N-aminopropylmorpholine | 0.2780 | 29 |
| Control | C | None | | 110–130 |
| 8 | C | N-aminopropylmorpholine | 0.2280 | 20–25 |

A.—Polyhexamethylene adipamide.
B.—Polyhexamethylene sebacamide.
C.—Copolymer from 38 mol % epsilonaminocaproic acid, 35 mol % A and 27 mol % B.

Polyamides of this invention can be prepared by the general methods described in the previously mentioned applications. Thus, it is possible to prepare the products of this invention by reacting polyamide-forming reagents with a viscosity stabilizer in the absence of a solvent (fusion method), in the presence of an inert solvent such as a monohydric phenol, or in the presence of an inert non-solvent such as a hydrocarbon or inert chlorinated hydrocarbon. Mixtures of solvents and non-solvents may also be used. The reaction is generally carried out in the neighborhood of 150–300° C. and preferably 220–290° C. The reaction may be effected at ordinary, increased, or decreased pressure. Often it is desirable, especially in the last stage of the reaction, to employ conditions, e. g., reduced pressure, which will aid in the escape of the water or other by-products formed in the reaction.

To prepare polyamides of the diamine-dibasic carboxylic acid type, it is advantageous to use the diamine-dibasic carboxylic acid salt, since this product is crystalline and easily obtained in a pure form. However the diamine may be reacted directly with a dicarboxylic acid or an amide-forming derivative of a dibasic carboxylic acid such as the ester, acid chloride, amide, or anhydride. The invention, as already indicated, is applicable to the preparation of viscosity stable amino acid polymer. The preparation of viscosity stable interpolymers, for example, those obtained by reacting an amino acid with a diamine-dibasic carboxylic acid mixture or a mixture of diamine-dibasic dicarboxylic acid salts, is also within the scope of this invention.

The diamines used in the practice of this invention are those whose amino nitrogens carry at least one hydrogen. The invention herein described is very useful in the preparation of viscosity stable superpolyamides from diamines of the formula $H_2NCH_2RCH_2NH_2$ and dicarboxylic acids of the formula $HOOCCH_2R'CH_2COOH$ in which R and R' represent divalent hydrocarbon radicals free from non-benzenoid unsaturation, that is, they are free from aliphatic (olefinic or acetylenic) unsaturation and in which R has a chain length of at least two carbon atoms. It is especially useful when applied to the preparation of superpolyamides of the above type in which R is $(CH_2)_x$ and R' is $(CH_2)_y$ in which $x$ and $y$ are integers and $x$ is at least two. These products are easily obtained in the superpolymeric or fiber-forming state and are readily spun into filaments which can be cold-drawn with especial facility to fibers of excellent quality.

While this invention is particularly applicable in the preparation of polyamides suitable for melt spinning, this by no means limits the extent or utility of the present invention. Viscosity stable fiber-forming polyamides are also useful in spinning from solution and in other applications, for example, in the preparation of films, ribbons, bands, sheets, bristles, molded articles, and the like. Non-fiber-forming polyamides, e. g., resinous polyamides, can also be obtained in the viscosity stable form by the methods of the present invention. Such products are particularly useful in the preparation of coating, molding, sizing, impregnating, adhesive, and related compositions. It is within the scope of this invention to mix viscosity stable polyamides with each other as well as with other ingredients, such as cellulose derivatives, e. g., ethyl cellulose, benzyl cellulose, cellulose acetate, nitrocellulose; natural resins; synthetic resins, e. g., polyhydric alcohol-polybasic acid resins, vinyl resins, phenol-formaldehyde resins, urea-formaldehyde resins, polyamides, etc.; oils, e. g., drying oils; plasticizers; pigments; fillers; dyes; etc.

In addition to viscosity stabilization, the employment of N-alkylmorpholines in accordance with the principles of my invention yields polyamides which have improved affinity for acid dyes. Thus, a polyamide stabilized with N-alkylmorpholine can be dyed to deeper shades with acid colors than can the unstabilized polymer.

As many apparently widely different embodiments of this invention may be made without departing from the spirit and scope thereof, it is to be understood that I do not limit myself to the specific embodiments thereof except as defined in the appended claims.

I claim:

1. Linear polycarbonamides prepared from reactants of the class consisting of (1) diamines and dibasic carboxylic acids and their amide-forming derivatives, and (2) monoamino carboxylic acids and their amide-forming derivatives, viscosity-stabilized with an N-aminoalkylmorpholine of the formula:

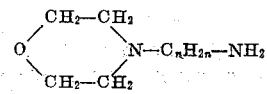

wherein $n$ is a whole number from 2 to 12 inclusive, and the nitrogen atoms are separated by at least two carbon atoms.

2. Film-forming linear superpolyamides of diamines of the formula $NH_2CH_2RCH_2NH_2$ and dibasic carboxylic acids of the formula $$HOOC-CH_2R'CH_2-COOH$$

R and R' in said formulae being divalent hydrocarbon radicals free from aliphatic unsaturation and R having a chain length of at least two carbon atoms, viscosity-stabilized with an N-aminoalkylmorpholine of the formula:

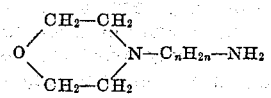

wherein $n$ is a whole number from 2 to 12 inclusive and the nitrogen atoms are separated by at least two carbon atoms, said polyamides yielding the hydrochloride of the N-aminoalkylmorpholine on hydrolysis with hydrochloric acid.

3. The product of claim 2 in the form of a filament.

4. The product of claim 2 wherein the stabilizer is N-aminopropylmorpholine of the formula:

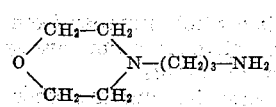

5. The product of claim 2 wherein the stabilized is N-aminoethylmorpholine of the formula:

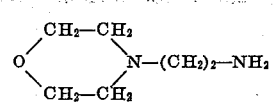

6. The product of claim 2 wherein the stabilizer is N-aminobutylmorpholine of the formula:

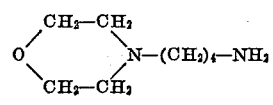

7. The product of claim 2 wherein the stabilizer is N-aminoamylmorpholine of the formula:

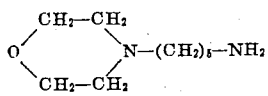

8. The product of claim 2 wherein the stabilizer is N-aminohexylmorpholine of the formula:

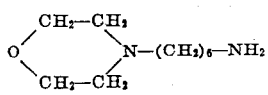

9. A process for making fiber-forming substantially viscosity-stable linear superpolyamides which comprises reacting polyamide-forming reactants of the class consisting of (1) diamines and dibasic carboxylic acids and their amide-forming derivatives, and (2) monoamino carboxylic acids and their amide-forming derivatives, under polymerizing conditions in the presence of from 0.1 to 5.0 molar per cent, based on the diamine reactant, of an N-aminoalkylmorpholine of the formula:

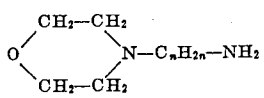

wherein $n$ is a whole number from 2 to 12 inclusive and the nitrogen atoms are separated by at least two carbon atoms, as stabilizer.

10. The process of claim 9 wherein the stabilizer is N-aminopropylmorpholine of the formula

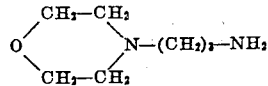

11. A process for preparing fiber-forming polymers having improved melt-spinning characteristics which comprises heating substances of the class consisting of synthetic linear carbonamides prepared from reactants of the class consisting of (1) diamines and dibasic carboxylic acids and their amide-forming derivatives, and (2) monoamino carboxylic acids and their amide-forming derivatives, said polycarbonamides capable of being formed into fibers showing by characteristic X-ray patterns orientation along the fiber axis, and reactants producing said polycarbonamides, with from 0.1 to 5.0 molar per cent, based on the monomeric diamine reactant represented in said polyamides, of an N-aminoalkylmorpholine of the formula:

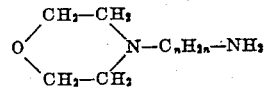

wherein $n$ is a whole number from 2 to 12 inclusive and the nitrogen atoms are separated by at least two carbon atoms.

12. A process for making fiber-forming substantially viscosity-stable polyamides which comprises heating under polymerizing conditions a mixture of polyamide-forming reactants comprising substantially equimolecular proportions of a diamine of the formula $H_2NCH_2RCH_2NH_2$ and a compound of the class consisting of dicarboxylic acids of the formula $HOOCCH_2R'CH_2COOH$ and amide-forming derivatives of such acids, R and R′ in said formulae being divalent hydrocarbon radicals free from aliphatic unsaturation and R having a chain length of at least two carbon atoms, in the presence of from 0.1 to 5.0 molar per cent, based on the diamine, of a viscosity stabilizer of the formula:

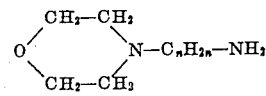

wherein $n$ is a whole number from 2 to 12 inclusive and the nitrogen atoms are separated by at least two carbon atoms.

13. The process of claim 12 wherein the viscosity stabilizer is N-aminopropylmorpholine of the formula:

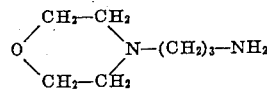

14. The process of claim 12 wherein the viscosity stabilizer is N-aminoethylmorpholine of the formula:

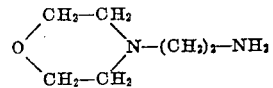

15. The process of claim 12 wherein the viscosity stabilizer is N-aminobutylmorpholine of the formula:

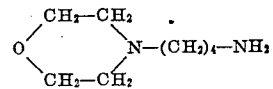

16. The process of claim 12 wherein the viscosity stabilizer is N-aminoamylmorpholine of the formula:

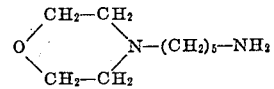

17. The process of claim 12 wherein the viscosity stabilizer is N-aminohexylmorpholine of the formula:

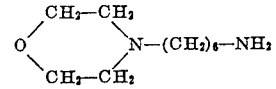

FREDERICK KINGSBURY WATSON.

REFERENCES CITED

The following references are of record in the file of this patent:

UNITED STATES PATENTS

| Number | Name | Date |
| --- | --- | --- |
| 2,142,007 | Schlack | Dec. 27, 1938 |
| 2,174,527 | Peterson | Oct. 3, 1939 |